(12) United States Patent
Zillmann

(10) Patent No.: US 6,755,058 B2
(45) Date of Patent: Jun. 29, 2004

(54) LOCK, PARTICULARLY FOR LOCKING THE STEERING SPINDLE OF A MOTOR VEHICLE

(75) Inventor: Horst Zillmann, München (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 0 days.

(21) Appl. No.: 10/312,579

(22) PCT Filed: Mar. 26, 2002

(86) PCT No.: PCT/EP02/03367
§ 371 (c)(1),
(2), (4) Date: Jan. 16, 2003

(87) PCT Pub. No.: WO02/090152
PCT Pub. Date: Nov. 14, 2002

(65) Prior Publication Data
US 2004/0007030 A1 Jan. 15, 2004

(30) Foreign Application Priority Data
May 4, 2001 (DE) .......................... 101 21 714

(51) Int. Cl.⁷ ..................... B60R 25/02; E05B 65/12
(52) U.S. Cl. ................................. 70/252; 70/186
(58) Field of Search .................... 70/182–186, 252; 292/144

(56) References Cited

U.S. PATENT DOCUMENTS

| | | | | |
|---|---|---|---|---|
| 3,959,996 A | * | 6/1976 | Thirion | 70/186 |
| 4,309,882 A | * | 1/1982 | Maiocco | 70/186 |
| 4,414,830 A | * | 11/1983 | Maiocco | 70/252 |
| 4,466,262 A | * | 8/1984 | Maiocco et al. | 70/252 |
| 4,581,909 A | * | 4/1986 | Weber | 70/186 |
| 5,495,732 A | * | 3/1996 | Nagae et al. | 70/252 |
| 5,632,167 A | * | 5/1997 | Kawachi et al. | 70/186 |
| 5,718,132 A | * | 2/1998 | Riefe et al. | 70/186 |
| 5,848,540 A | * | 12/1998 | Pieper | 70/252 |
| 5,906,120 A | * | 5/1999 | Thacker et al. | 70/186 |
| 5,974,841 A | * | 11/1999 | Naganuma | 70/186 |
| 2001/0025516 A1 | | 10/2001 | Starken | |

FOREIGN PATENT DOCUMENTS

| | | | |
|---|---|---|---|
| DE | 44 36 326 C1 | 10/1995 | |
| DE | 199 61 975 C1 | 12/2000 | |
| DE | 100 30 688 C1 | 10/2001 | |
| DE | 101 09 609 C1 | 10/2002 | |
| GB | 2009833 A | * 6/1979 | .......... E05B/65/12 |

* cited by examiner

Primary Examiner—Anthony Knight
Assistant Examiner—Christopher Boswell
(74) Attorney, Agent, or Firm—Bacon & Thomas, PLLC

(57) ABSTRACT

A lock includes a locking element and a control element displaceable to-and-fro between a locked and an unlocked position and a control element also rotatable to-and-fro by a drive to axially displace in either direction a locking element or a drive element cooperating with the locking element. The control element encloses the locking element for the drive element and includes two helical inner grooves, bevels or a thread which cooperates with one or two radially extending protrusions of the locking element. Each groove, bevel or thread merges into an end surface located in a plane extending orthogonal to the axis of rotation of the control element and may include an intermediate surface also located in a plane extending perpendicular to the axis of rotation of the control element.

8 Claims, 17 Drawing Sheets

LOCK, PARTICULARLY FOR LOCKING THE STEERING SPINDLE OF A MOTOR VEHICLE

BACKGROUND AND RELATED ART

The present invention relates to a lock, in particular a lock for locking a motor-vehicle steering column, said lock being fitted with a locking element which is displaceable to-and-fro between a locked and an unlocked position, and with a control element that can be rotated to-and-fro by a drive to axially displace said locking element or a drive element cooperating with the locking element in either direction, said control element enclosing the locking element or its drive element and furthermore:

(a) being fitted with two inner bevels or two inner helical grooves that cooperate with two protrusions which extend radially and mutually diametrically opposite with respect to the control element's axis of rotation and which are part of the locking element or its drive element, said bevels or grooves each merging at the end that corresponds to the unlocked position of the locking element into an end face located in a plane extending perpendicular to the axis of rotation of the control element, or (b) comprising an inside thread that cooperates with a protrusion of the locking element or its drive element which extends radially relative to the axis of rotation of the control element and said inside thread merging at the end corresponding with the locking element's unlocked position into an end face located in a plane extending perpendicular to the control element's axis of rotation.

The state of the art includes a lock, in particular for locking a motor vehicle steering column, which is fitted with a locking element displaceable to-and-fro between a locked and an unlocked position and furthermore with a control element rotatable to-and-fro by a drive for axially displacing in either direction the locking element or a drive element cooperating with the locking element, wherein special measures are taken in order to assure that the locking element each time moves precisely into the locked or the unlocked position, but no farther, even if the control element should continue rotating, that is, even if the drive does not stop at once when the locking element has reached the locked or the unlocked position. For that purpose the locking element or its drive element and the control element are arranged coaxially, and the locking element or its drive element and the control element cooperate by means of:

two radial protrusions which are configured diametrically opposite each other relative to the control element's axis of rotation and which each are spring loaded and displaceable in a direction perpendicular to the control element's axis of rotation, and two bevels as well as two end faces located in a common plane which extends perpendicular to the control element's axis of rotation, each of said end faces adjoining a respective bevel and extending as far as beside the other bevel, in a manner such that the inner locking element or its inner drive element, upon rotation of the outer control element in that direction in which the protrusions run on the bevels to the end faces, is axially displaced correspondingly and stops moving when the protrusions pass from the bevels onto the end faces and remains in such axial position until the control element is rotated in the opposite direction, whereupon the protrusions run on the bevels away from the end faces, with the locking element or its drive element moving axially in the opposite direction. The protrusions may be provided on the locking element or its drive element, the bevels and the end faces may be provided on the control element and the protrusions may be in the form of two pins located in a common transverse borehole of the locking element or its drive element and loaded by a common helical compression spring (DE 44 36 326 C1).

Moreover, a lock already has been proposed, in particular to lock a motor-vehicle steering column, which is fitted with a locking element displaceable to-and-fro between a locked and an unlocked position, and further with a control element that is rotatable to-and-fro by means of a drive to axially displace the locking element or a drive element cooperating with the locking element in either direction, the control element enclosing the locking element or its drive element and comprising two inner bevels cooperating with two radial protrusions of the locking element or of its drive element which are diametrically opposed to each other relative to the control element's axis of rotation, each bevel merging at each end into an end face located in a plane extending perpendicular to the axis of rotation of the control element, wherein:

one bevel of the control element and its two end faces are offset in the direction of the control element's axis of rotation relative to the other control element's bevel and its two end faces, and the one bevel and its two end faces are located at a greater distance from the control element's axis of rotation than the other bevel and its two end faces, and the two protrusions of the locking element or of its drive element are mounted in a stationary manner, such that the protrusion with which the control element's bevel that is farther from the control element's axis of rotation cooperates and with which its two end faces cooperate is offset by a corresponding distance in the direction of the axis of rotation of the control element relative to that protrusion with which the other bevel of the control element and its two end faces cooperate and is correspondingly longer.

The control element may be provided at the end of each end face remote from the associated bevel with a stop surface for that protrusion of the locking element or its drive element with which the end face cooperates. The protrusions of the locking element or its drive element each may consist of a pin force-fitted in a borehole of the locking element or its drive element (DE 101 09 609.7).

A further lock already has been proposed, particularly for locking a motor-vehicle steering column, which is fitted with a locking element displaceable to-and-fro between a locked and an unlocked position and further comprising a control element rotatble to-and-fro by a drive for axially moving the locking element or a drive element cooperating with it in either direction, the locking element or its drive element and the control element being arranged coaxially and cooperating by means of:

a cross-pin resting in an axially displaceable manner in a cross-borehole of the inner locking element or its inner drive element, and two helical inner grooves and a planar end face of the outer control element, said end face extending perpendicularly to the control element's axis of rotation and adjoining the two grooves, and being bounded by a sidewall running from the bottom of one groove at a distance past the other groove along the outer side thereof to the locking element or its drive element, in such a way that the locking element or its drive element upon rotation of the control element in that direction where the two cross-pin ends projecting from the cross-borehole of the locking element or its drive element run in the grooves to the control element's end face is correspondingly displaced axially in order that when the cross-pin ends pass from the grooves onto the end face, the locking element or its drive element remains stationary and remains in this axial position until the control element is rotated in the opposite direction and the cross-pin ends move inside the grooves away from the end face, so that the locking element or its drive element moves axially in the opposite direction. The control element's grooves may merge at the ends located away from the first end face into a second control element's end face which extends perpendicularly to the control element's axis of rotation and is bounded by a sidewall running from the bottom of one groove at a distance from the other groove and past it along its outer side to the locking element or its drive element, as a result of which, the locking element or its drive element, when the control element is rotated in that direction in which the two ends of the cross-pin projecting from the cross-borehole of the locking element or its drive element run in the grooves from the first end face to the second end face of the control element, after the corresponding axial displacement of the locking element or its drive element, when the cross-pin ends pass from the grooves onto the second end face, stops moving and remains in this axial position until the control element is rotated in the opposite direction, whereupon the cross-pin ends run in the grooves from the second end face to the first end face, so that the locking element or its drive element is axially displaced in the opposite direction (German Patent No. 100 30 680 granted Oct. 18, 2001 or U.S. Pat. No. 6,543,262 issued Apr. 8, 2003).

Lastly a lock is known particularly for locking a motor-vehicle steering column which comprises a locking element displaceable to-and-fro between a locked and an unlocked position, and further a control element rotatable to-and-fro by a drive to axially displace the locking element in either direction, the control element enclosing the locking element and being fitted with an inside thread which cooperates with a locking-element's protrusion extending radially relative to the axis of rotation of the control element and which inside thread merges at each of its two ends into an end face situated in a plane extending perpendicular to the control element's axis of rotation. The locking element's protrusion is in the form of a cross-pin displaceable axially in a cross-borehole of the locking element. Each end face of the control element's inside thread is bounded by a sidewall configured in such a way that after the cross-pins transition onto the end face due to the control element's rotation in the corresponding direction, the cross-pin remains on this end face, even if the control element is further rotated in the same direction, and leaves this end face and enters the inside thread by an end projecting from the locking element only when the control element is rotated in the opposite direction (German Patent No. 199 61 975 granted Dec. 14, 2000 or U.S. Published Patent Application No. US2001/0025516A1 published Oct. 24, 2001.

The objective of the present invention is to create a lock of the kind discussed at the beginning, the operation of which is furthermore improved.

BRIEF DESCRIPTION OF THE DRAWINGS

An embodiment of the lock of the invention is described below with reference to the attached drawings, wherein.

DETAILED DESCRIPTION

Figure 1:
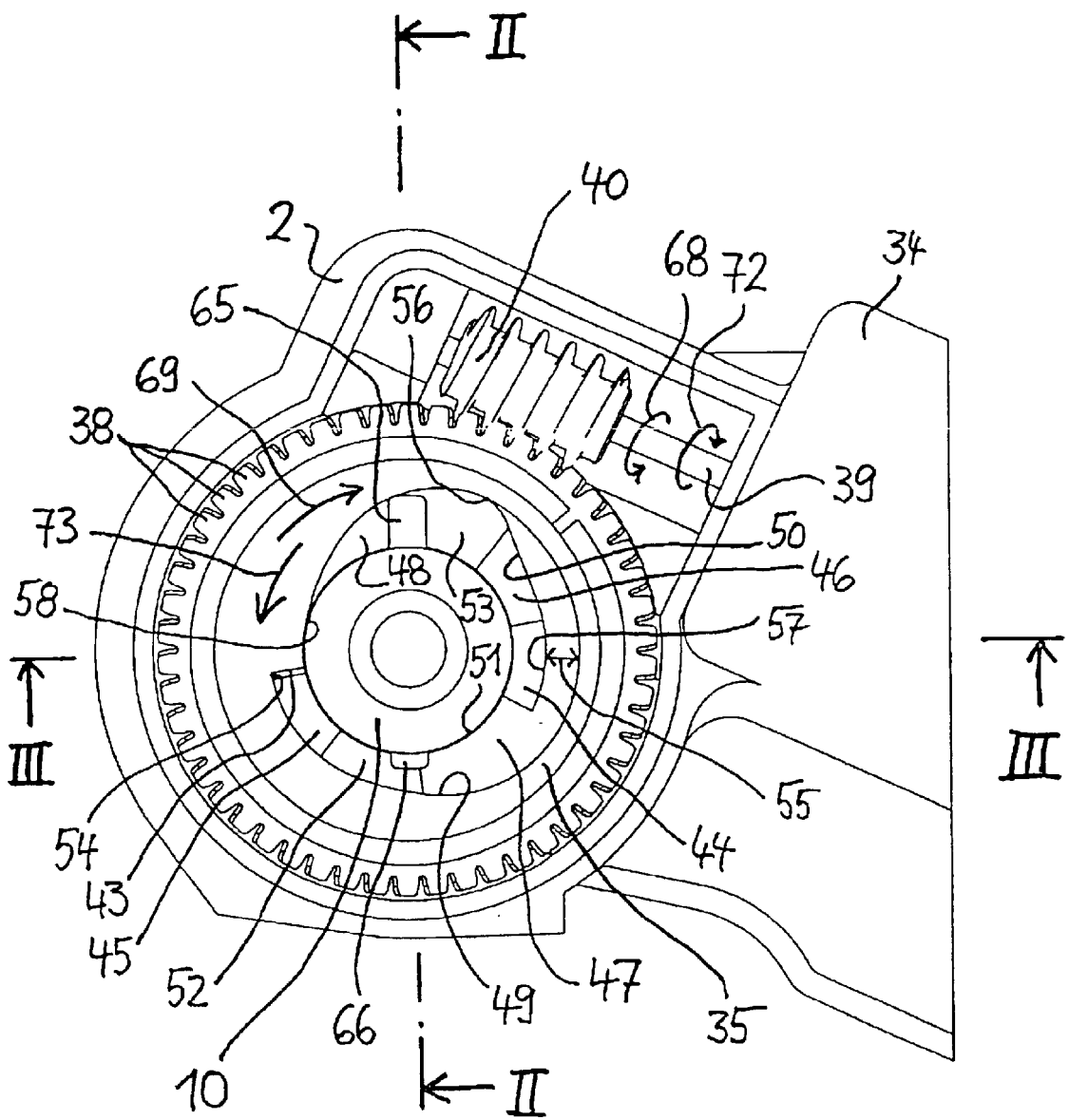
FIG. 1 is a topview of a lock according to the invention looking in the direction of the arrow I of FIG. 2 with the lock housing cover removed.
Figure 2:
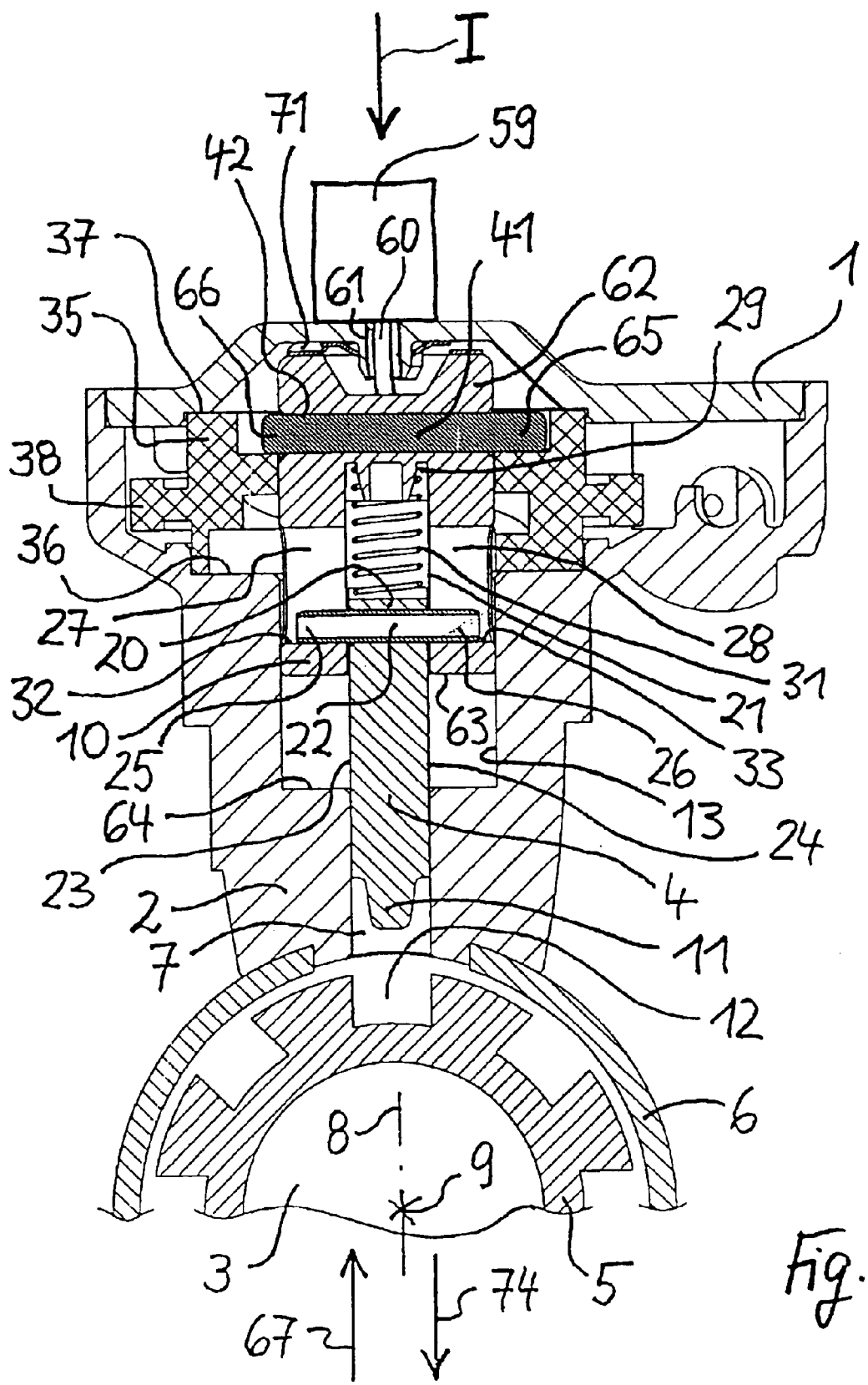
FIG. 2 is a longitudinal section view taken along line II—II of FIG. 1.
Figure 4:
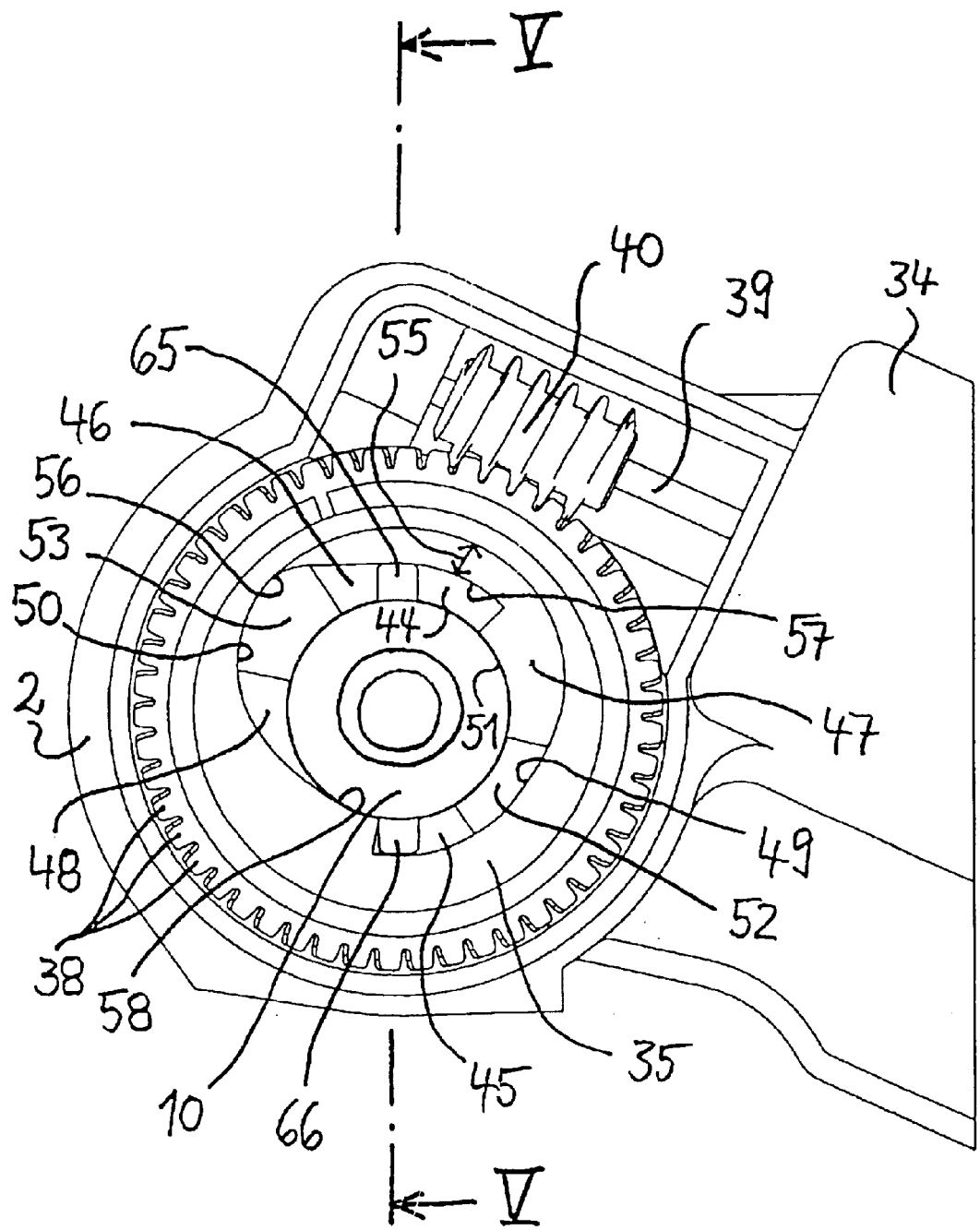
Figure 5:
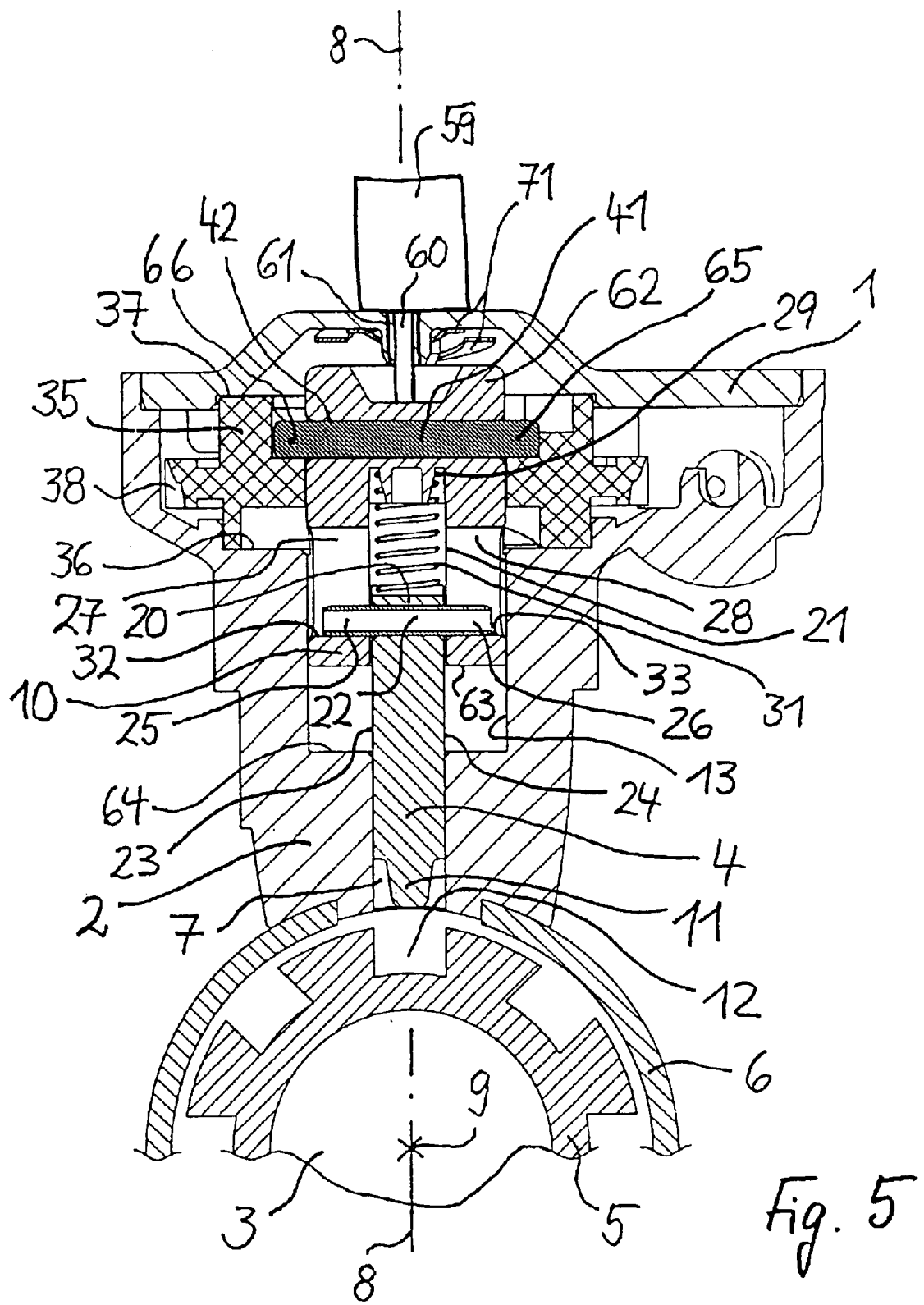
FIG. 5 is a longitudinal section view taken along line V—V of FIG. 4.

The lock shown in FIGS. 1, 2, 4, 5, 7 and 8 comprises a housing 2 closed by a cover 1 and is used to lock a motor-vehicle steering column 3, shown in FIGS. 2 and 5, by means of a locking element 4 which cooperates with a locking bush 5 affixed to the steering column 3. The steering column 3 and the locking bush 5 are enclosed by a tubular casing 6 to which is affixed the housing 2. The locking element 4 is in the form a rectangular cross-section bolt and rests in an axially displaceable manner in a bore 7 of corresponding cross-section in the housing 2, the longitudinal axis 8 of said bore 7 orthogonally intersecting the longitudinal axis 9 of the steering column 3.

Figure 8:
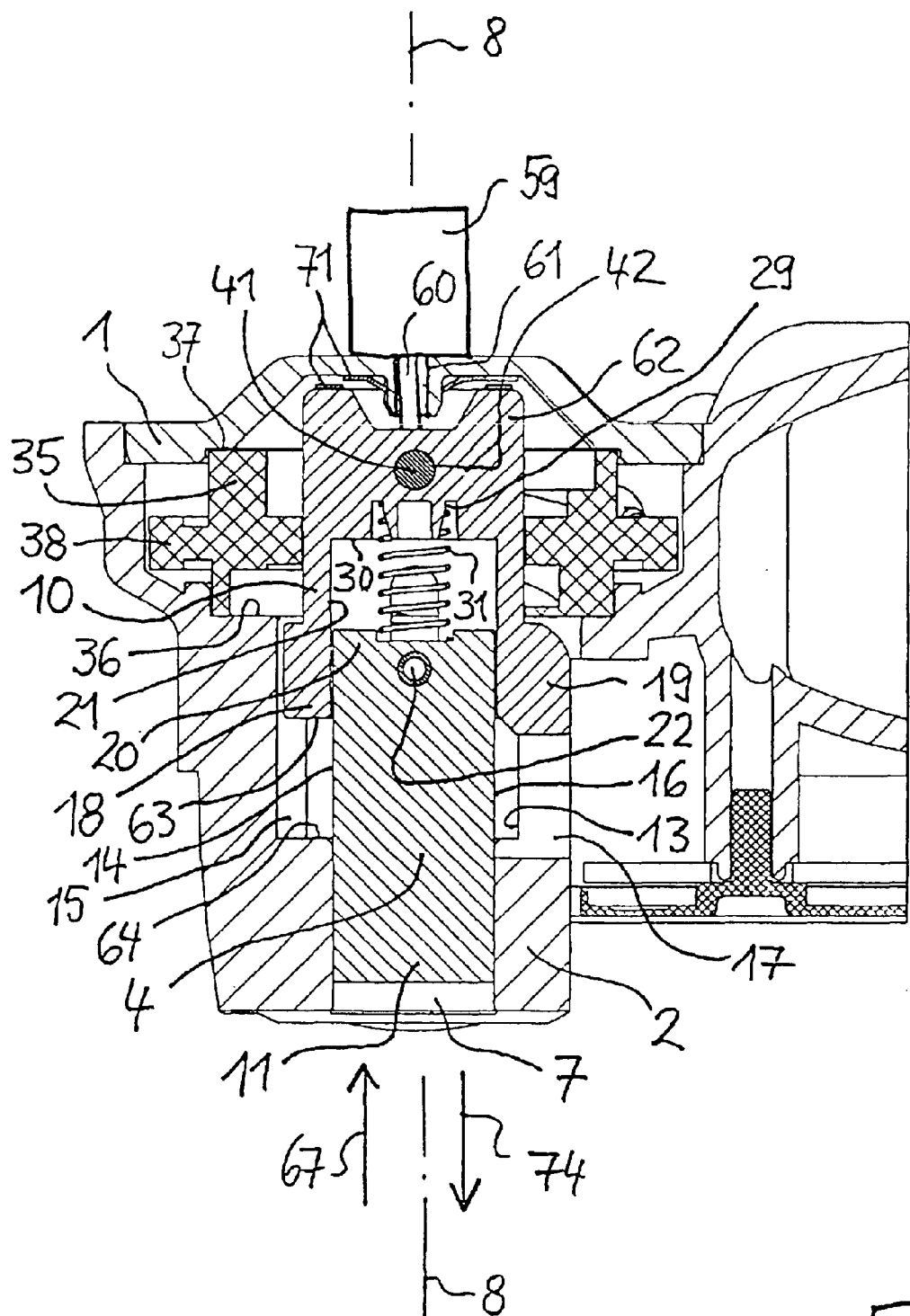
FIG. 8 is a longitudinal section view taken along line VIII—VIII of FIG. 7.

The locking element 4 may be displaced by a drive element 10 from a locked position where it has entered, by its end 11 away from the drive element 10, one of a plurality of locking apertures 12 of the locking bush 5, so that the steering column 3 is irrotational, through a first unlocked position shown in FIG. 5 to a second unlocked position shown in FIGS. 2 and 8 and then back into the locked position. In the first and second unlocked positions, the end 11 of locking element 4 engages none of the locking apertures 12 of the locking bush 5 and thus releases the steering column 3.

The drive element 10 is configured as a cylindrical bolt and rests in an axially displaceable manner in a cylindrical borehole 13 of the housing 2, said borehole 13 running coaxially with the bore 7 receiving the locking element 4. Opposite the left narrow lateral surface 14 of the locking element 4 shown in FIG. 8, a longitudinal groove 15 formed in the housing 2 opens into the borehole 13, and opposite the right narrow lateral surface 16 of the locking element 4 shown in FIG. 8 the borehole 13 communicates with a longitudinal slot 17 provided in the housing 2. An external, radial boss 18 of the drive element 10 enters the longitudinal groove 15 and the longitudinal slot 17 receives an external, radial protrusion 19 of the drive element 10.

The end 20 of the locking element 4 located away from the steering column 3 is received in a blind hole 21 provided in the drive element 10 and having a cross-section which corresponds to the rectangular cross-section of the locking element 4. The end 20 is fitted with a cross-pin 22 running orthogonally to the two wide side walls 23, 24 of the locking element 4, with the two ends 25, 26 of said cross-pin projecting from the locking element 4 and engaging two lateral elongated slots 27, 28 of the drive element 10. A helical compression spring 31 is mounted between the end 20 of the locking element 4 and an annular recess 29 in the bottom 30 of the blind hole 21 of the drive element 10 and presses the two projecting ends 25, 26 of the cross-pin 22 of the locking element 4 against the ends 32, 33 of the two elongated slots 27, 28 of the drive element 10 that are closest to the steering column 3. The locking element 4 is able to enter the blind hole 21 of the drive element 10 against the opposition of the helical compression spring 31 if, during the motion of the locking element 4 caused by the drive element 10 towards the locked position, no locking aperture 12 of the locking bush 5 seated on the steering column 3 is aligned to receive the free end 11 of said locking element.

A control element 35 which can be rotated to-and-fro by means of a reversible electric motor 34 is provided to axially displace the drive element 10 into the position of FIG. 5 and further into the position of FIGS. 2 and 8 to drive the locking element 4 into respectively the first and the second unlocked position, and in the opposite direction to drive the locking element 4 into the locked position. The control element 35 is arranged coaxially with the drive element 10 and encloses this drive element 10, being rotatably supported in the housing 2 about the common longitudinal axis 8 of the locking element's bore 7 and the driving element's borehole 13 between an annular surface 36 of the housing 2 that is coaxial with the longitudinal axis 8 and an annular surface 37 of the cover 1 that is coaxial with the longitudinal axis 8. The control element 35 is designed as a worm gear with outer teeth 38 that are engaged by a drive worm 40 affixed to the output shaft 39 of the electric motor 34. This electric motor 34 may be a 12 VDC motor which is reversible by polarity reversal and which is stationary when no power is applied to it.

The outer control element 35 cooperates with a cylindrical cross-pin 41 of the inner drive element 10, said pin resting in an axially slidable manner within a cylindrical cross-borehole 42 of the drive element 10. For that purpose the control element 35 is fitted with two helically running inside grooves 43, 44 and with two intermediate surfaces 45, 46 located in a common plane extending perpendicular to the axis of rotation 8 of the control element 35 and with two end faces 47, 48 located in a common plane extending perpendicular to the axis of rotation 8 of the control element 35, the intermediate surfaces 45, 46 and the end faces 47, 48 being bounded by two sidewalls 49, 50 each running in a specific direction.

The two inner grooves 43, 44 of the control element 35 run along the cylindrical borehole 51 of the control element 35 in which the drive element 10 is received and then each merge via the intermediate surface 45 and respectively the other intermediate surface 46 of the control element 35 into the end face 47 or the other end face 48 of the control element 35. A bevel 52 or respectively 53 of the control element 35 runs between each intermediate surface 45 or respectively 46 and an associated end face 47 or respectively 48. The slope of the bevels 52, 53 is the same as that of the grooves 43, 44.

The vertical first sidewall 49 bounding the intermediate surface 45, the adjoining bevel 52 and the subsequent end face 47 of the groove 43 of the control element 35, runs from the bottom 54 of this groove 43 externally at a given distance 55 from and past the other groove 44 of the control element 35 and its intermediate surface 46 as far as to an end 56. The vertical second sidewall 50 bounding the intermediate surface 46, the adjoining bevel 53 and the subsequent end face 48 of the other groove 44 of the control element 35 runs from the bottom 57 of this groove 44 outward to the end 56 of the first sidewall 49 and in adjoining manner as a continuation of the first sidewall 49 inward to the borehole 51 of the control element 35 that receives the drive element 10, in order to merge at the end 58 into the borehole 51.

A switch 59 is mounted on the cover 1 of the housing 2 and is actuated by the drive element 10 to generate a signal indicating that the locking element 4 is in the first unlocked position of FIG. 5, such signal being required to start the engine of the motor vehicle. The switch 59 is fitted with an axially displaceable switching pin 60 passing through a borehole 61 of the cover 1 and cooperating with the cover-side end 62 of the drive element 10.

The above discussed motor-vehicle steering column lock operates as follows:

When the locking element 4 is in the locked position, the drive element 10 rests with its end 63 enclosing the locking element 4 at the bottom 64 of the borehole 13 of the housing 2 that receives the drive element 10, with the cross-pin 41 of the drive element 10, i.e. the two ends 65, 66 of the cross-pin 41 which project from the cross-borehole 42 of the drive element 10, extending next to the annular surface 36 of the housing 2 on which the control element 35 is resting.

Figure 7:
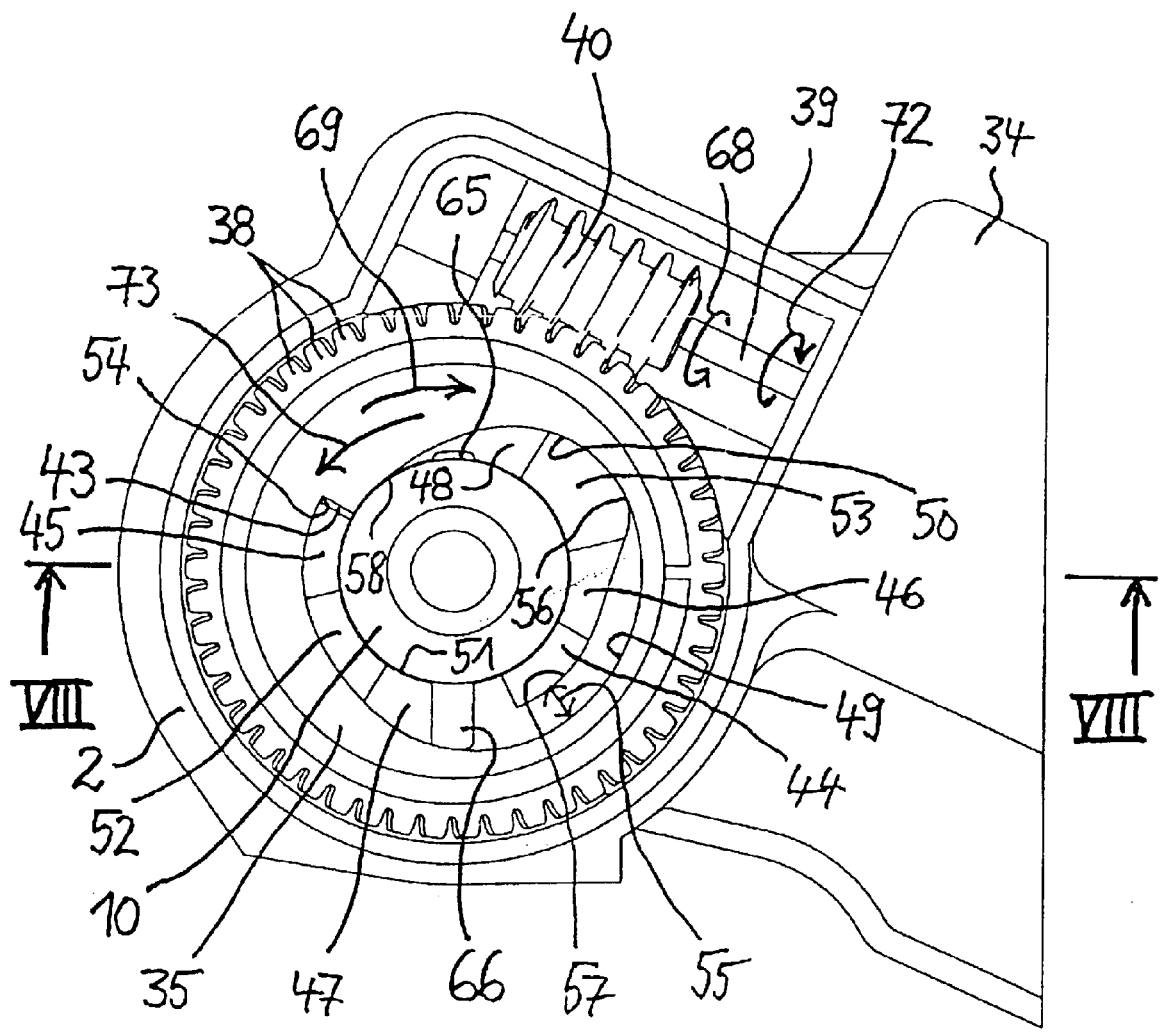
Figure 10:
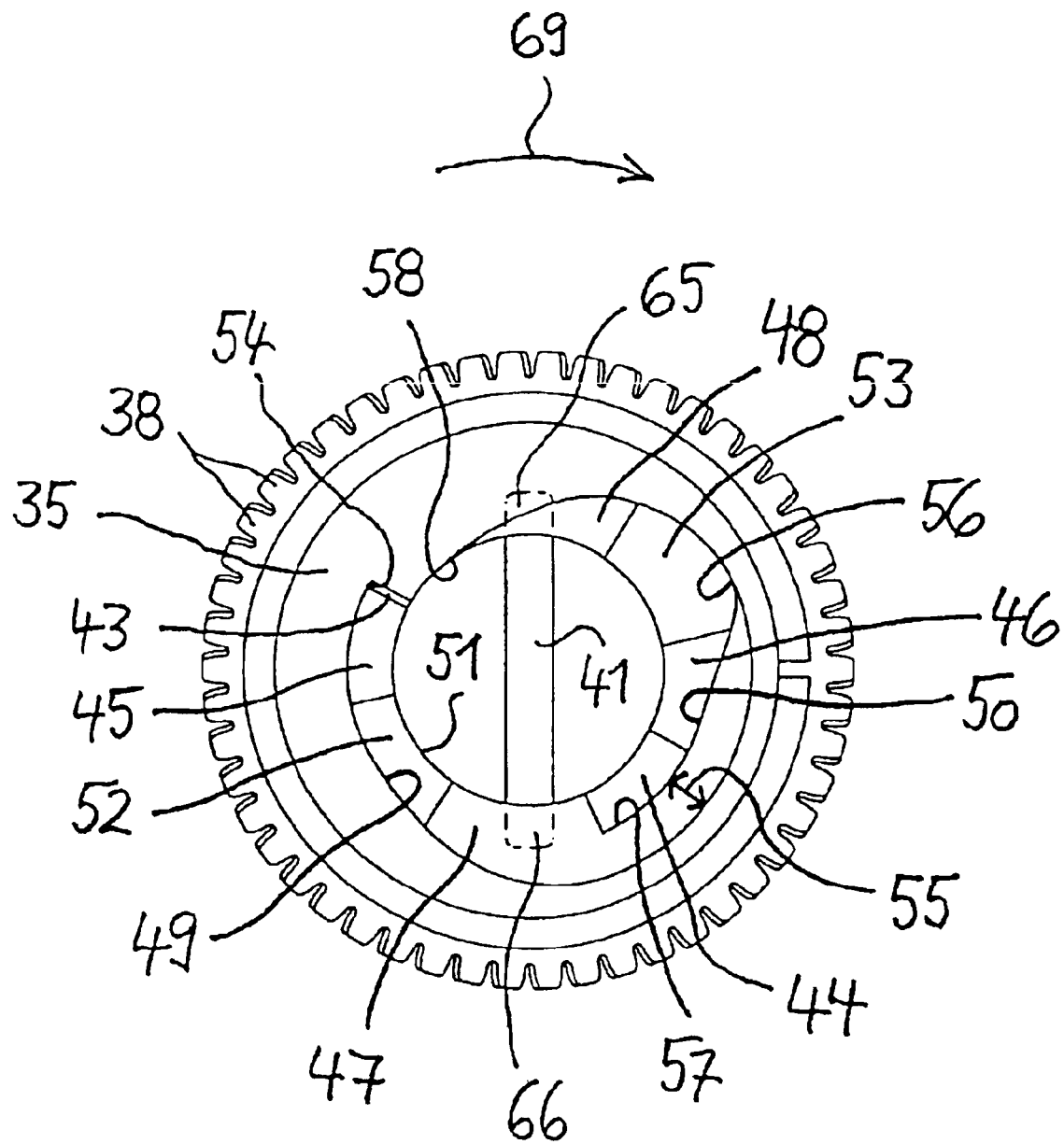
Figure 11:
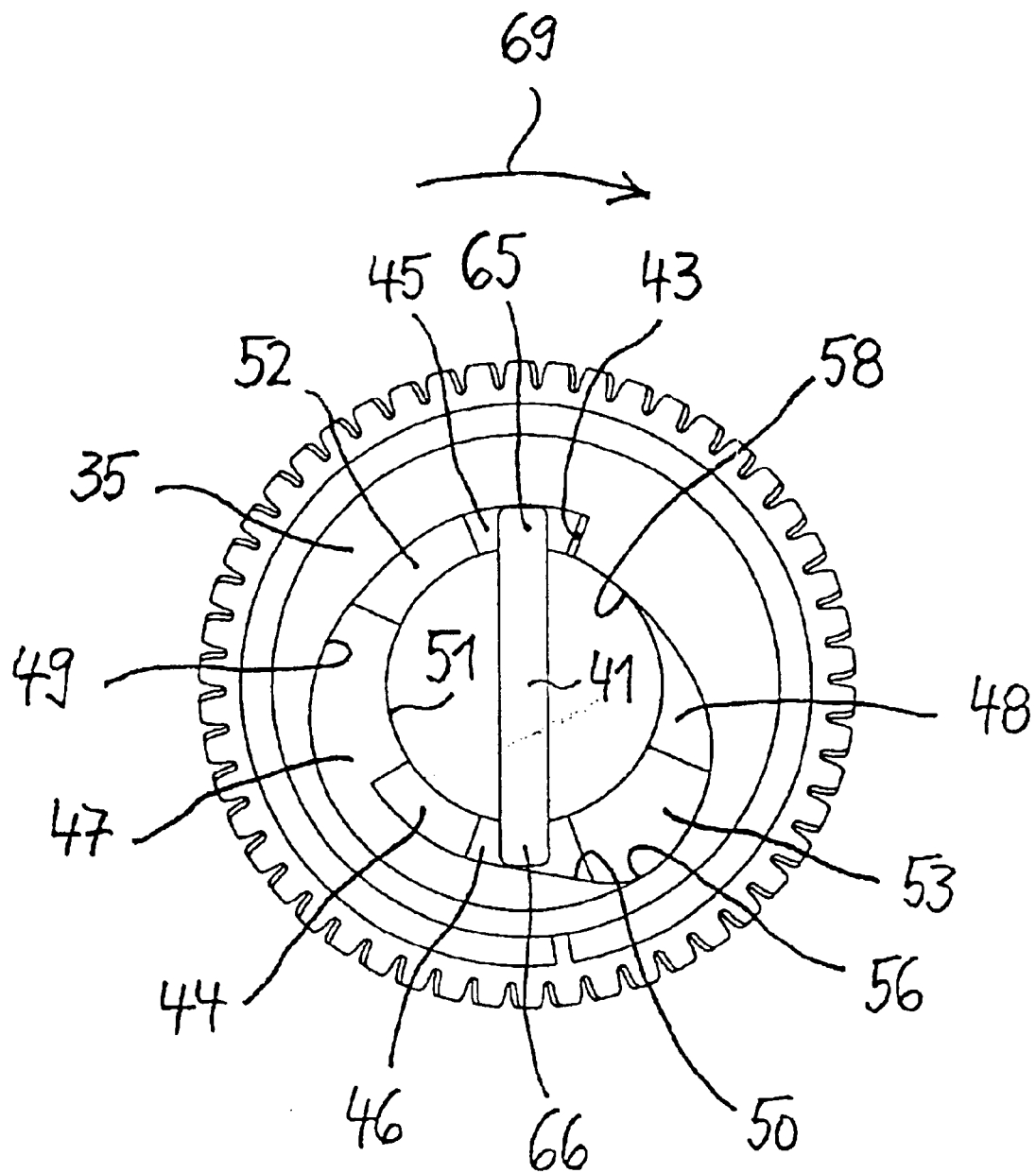
Figure 12:
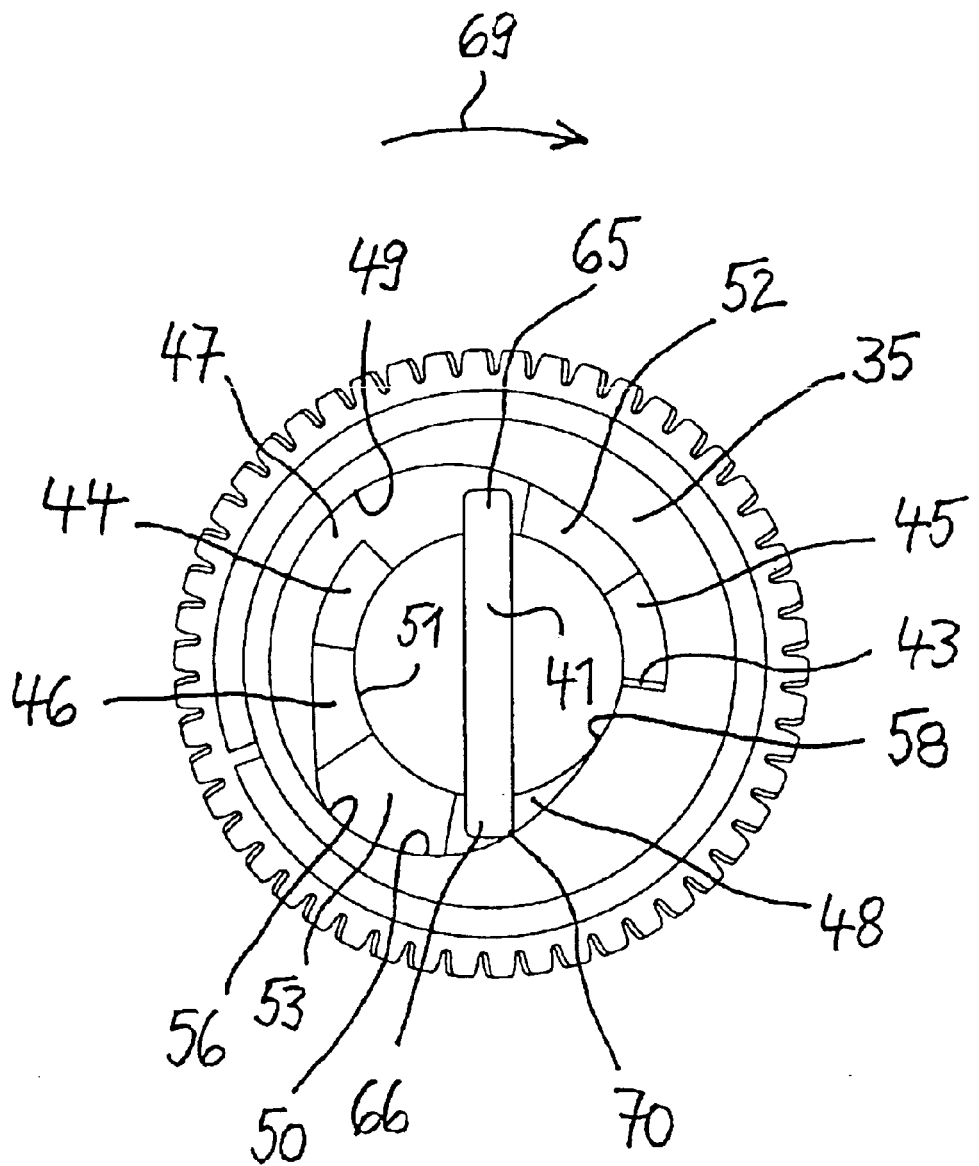
Figure 13:
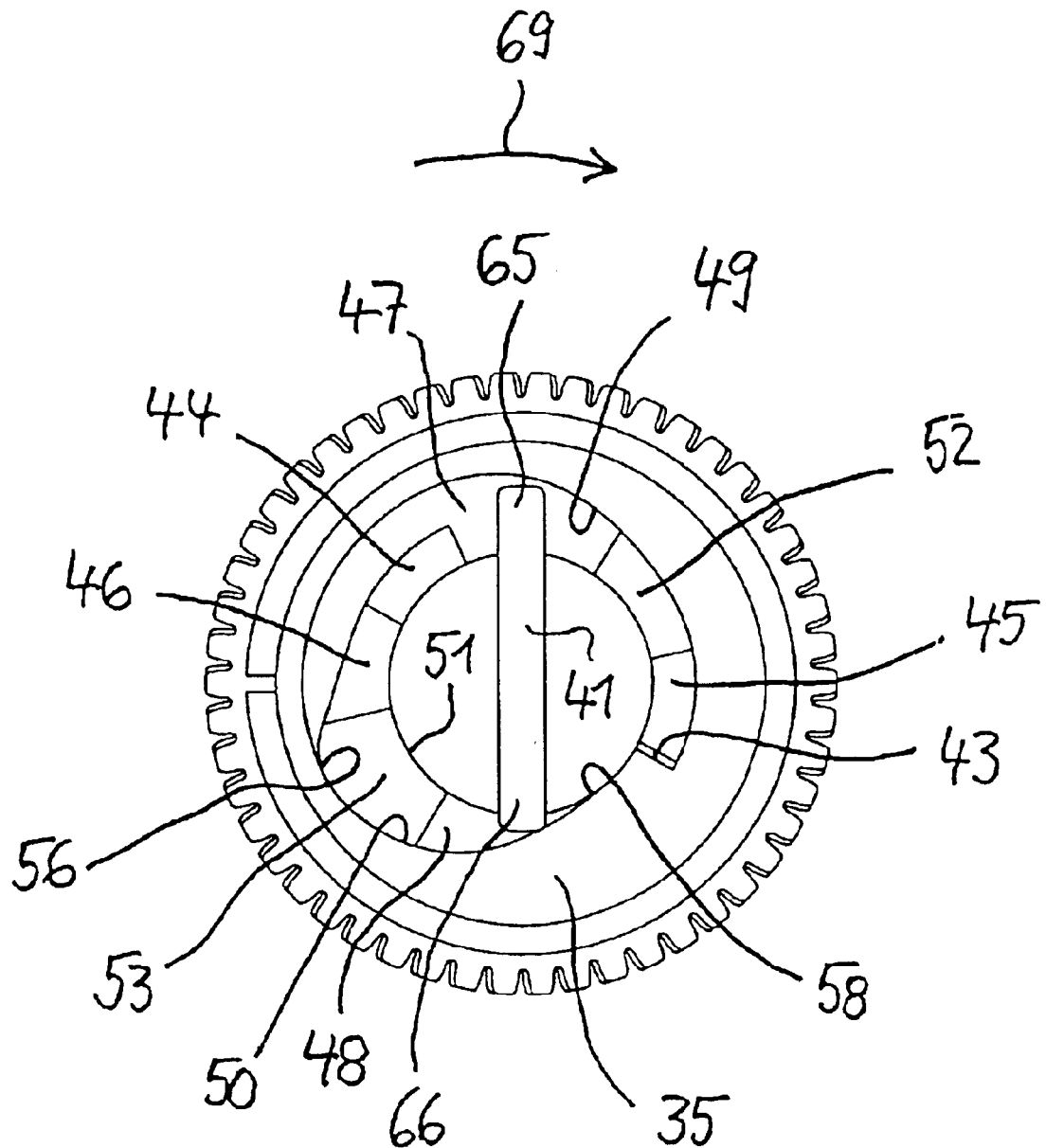
Figure 14:
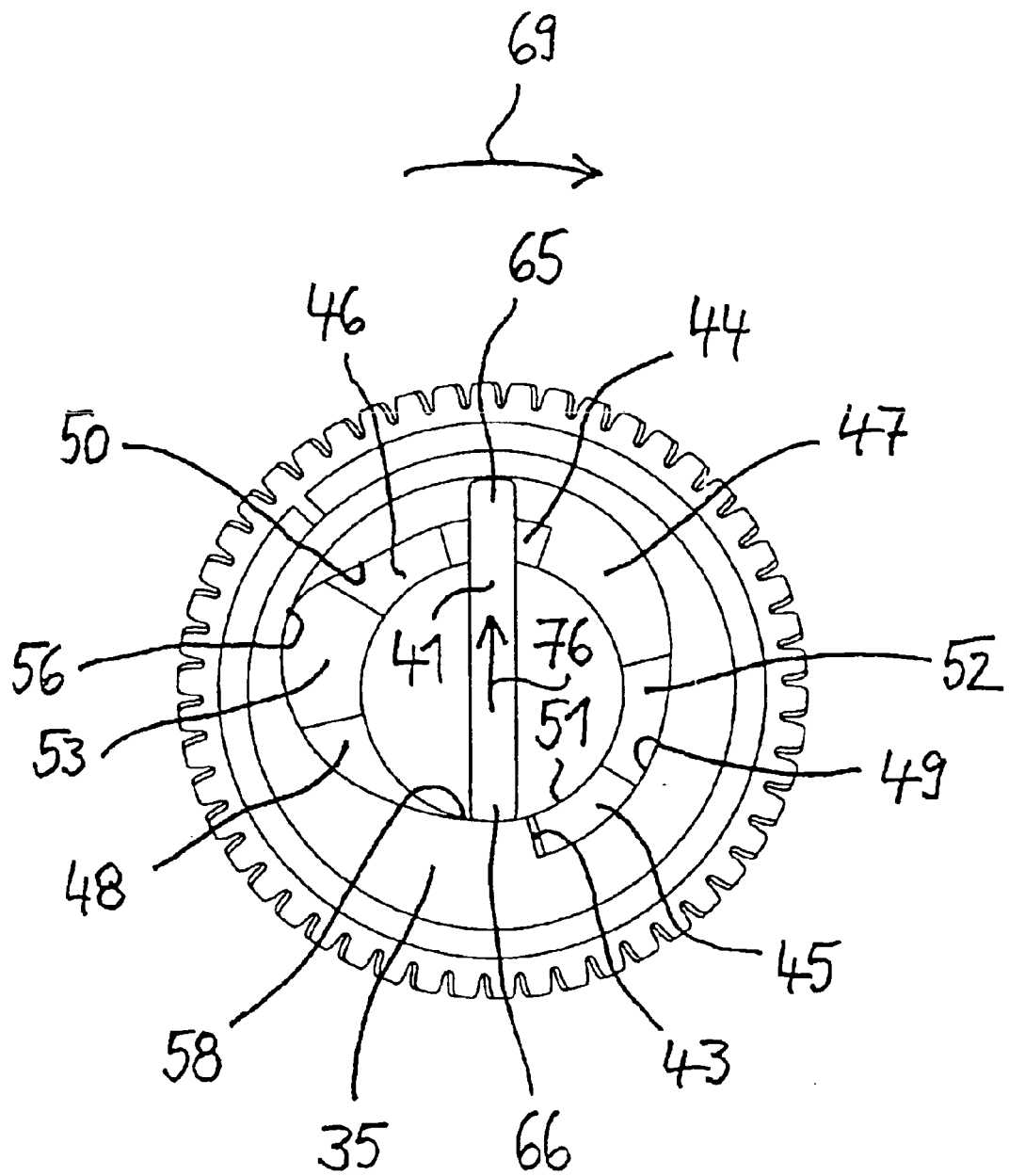

In order to displace the locking element 4 out of the locked position and the drive element 10 out of the described axial position axially in the direction of the arrow 67 of FIGS. 2 and 8 into the second unlocked position respectively into the corresponding axial position of FIGS. 2 and 8, the electric motor 34 is energized to rotate the drive worm 40 in the direction of the arrow 68 and the control element 35 in the direction of the arrow 69 in FIGS. 1 and 7. As a result, the two ends 65, 66 of the cross-pin 41 of the drive element 10 projecting from the cross-borehole 42 of the drive element 10 enter the two helical grooves 43, 44 of the control element 35 wherein they run toward the intermediate surfaces 45, 46 of the grooves as shown in FIG. 10 and then they slide along these intermediate surfaces 45, 46 and along the adjoining bevels 52, 53 toward the end faces 47, 48 of the grooves 43, 44, as shown in FIGS. 11 and 12.

With regard to the rotational positions of the control element 35 whereat the ends 65, 66 of the cross-pin 41 rest against the intermediate surfaces 45, 46 (FIG. 11), the drive element 10 assumes an axial position where the locking element 4 is in the first unlocked position as shown in FIG. 5. When the ends 65, 66 of the cross-pin 41 rest against the intermediate surfaces 45, 46, the locking element 4 is reliably precluded from moving back from the first unlocked position into the locked position. The drive element 10 actuates the switch 59 in the course of that rotation of the control element 35 where the ends 65, 66 of the cross-pin 41 rest against the bevels 52, 53. If there should be power failure to the electric motor 34 after the switch 59 was actuated, then the intermediate surfaces 45, 46 jointly with the ends 65, 66 of the cross-pin 41 will preclude the locking element 4 from moving back out of the first unlocked position into the locked position. As regards the rotational position of the control element 35 where the transition of the ends 65, 66 of the cross-pin 41 onto the end faces 47, 48 occurs, the drive element 10 has reached that axial position where the locking element 4 is located at the second unlocked position. The drive element 10 substantially remains in this axial position even when the control element 35 continues rotating in the direction of the arrow 69, whereby the locking element 4 substantially remains in the second unlocked position.

In this case the two ends 65, 66 of the cross-pin 41 projecting from the cross-borehole 42 of the drive element 10 run on the end faces 47, 48 of the control element 35 away from its bevels 52, 53 as shown in FIGS. 12 to 16. In the process, the lower cross-pin end 66 shown in FIGS. 10 to 16 comes to rest against the lower sidewall 50, namely at point 70 (FIG. 12) in order that, upon further rotation of the control element 35 in the direction of the arrow 69, it will be pushed by that segment of the second sidewall 50 which extends between the point 70 and the end 58 of the second sidewall 50 into the cross-borehole 42 of the drive element 10 (FIGS. 13, 14) as a result of which the upper cross-pin end 65 shown in FIGS. 10 to 16 shall correspondingly move out of the cross-borehole 42 of the drive element 10 in order to run on the end face 47 of the groove 43 and to pass the other groove 44 of the control element 35 and its intermediate surface 46, and then to slide along the bevel 53 as well as the end face 48 of the other groove 44 and in turn to be pushed by means of the second sidewall 50 into the cross-borehole 42 of the drive element 10 (FIGS. 15, 16), in the process of which the lower cross-pin end 66 will be displaced out of the cross-borehole 42 of the drive element 10 onto the bevel 52 and the end face 47 of the groove 43. As long as the control element 35 is rotating in the direction of the arrow 69, the cross-pin 41 of the drive element 10 cannot leave the end faces 47, 48 and the bevels 52, 53 of the control element 35, and consequently the drive element 10 remains in the corresponding axial positions. A disk spring 71 situated between the cover 1 of the housing 2 and the cover-side end 62 of the drive element 10 presses the cross-pin 41, i.e. its two ends 65, 66 projecting from the cross-bore hole 42 of the drive element 10, against the end faces 47, 48 and against the bevels 52, 53 respectively. Accordingly, the locking element 4 remains in the second unlocked position shown in FIGS. 2 and 8 substantially also when the cross-pin ends 65, 66 rest against the bevels 52, 53.

Only after the electric motor 34 starts rotating in the reverse direction and thereby both the drive worm 40 and the control element 35 are driven in the opposite direction, the drive worm 40 in the direction of the arrow 72 and the control element 35 in the direction of the arrow 73 in FIGS. 1 and 7, the locking element 4 is displaced out of the second unlocked position and the drive element 10 out of the corresponding axial position of FIGS. 2 and 8, namely axially in the direction of the arrow 74 in FIGS. 2 and 8 into the locked position and respectively into the corresponding axial position. This process begins as soon as the ends 65, 66 of the cross-pin 41 of the drive element 10 projecting from the cross-borehole 42 of the drive element 10 leave the end faces 47, 48 and respectively, the bevels 52, 53 of the control element 35, and the process ends as soon as the cross-pin ends 65, 66 leave the grooves 43, 44 of the control element 35 at their ends located away from the intermediate surfaces 45, 46, namely at the end 75 of the groove 43 shown in FIGS. 3 and 6 and the corresponding end of the other groove 44. The first sidewall 49 and the second sidewall 50 at the control element 35 assure that the cross-pin ends 65, 66 shall always be moved back into the grooves 43, 44 via the intermediate surfaces 45, 46 regardless of the rotational position relative to the cross-pin ends 65, 66 from which the control element 35 is rotated in the direction of the arrow 73, even when the cross-pin 41 has been fully pushed by the second sidewall 50 in the direction of the arrow 76 of FIG. 14 into the cross-borehole 42 of the drive element 10 and then has been displaced in the opposite direction according to the arrow 77 in FIG. 15 out of the cross-borehole 42 of the drive element 10.

Accordingly, the electric motor 34 need not stop immediately when the locking element 4 has reached the second unlocked position and when the drive element 10 has reached the corresponding axial position. Rather, the electric motor 34 may continue to run in the direction of the arrow 68 and may further rotate the control element 35 through an arbitrary angle in the direction of the arrow 69, the locking element 4 moving at most into the first unlocked position and the drive element 10 moving at most into the corresponding axial position. Moreover, after it was shut down, the electric motor 34 might be restarted in order to rotate the control element 35 in the direction of the arrow 69 and to cause a repeated actuation of the switch 59 by the drive element 10 in the event the signal to be generated by the switch 59, which indicates that the locking element 4 assumes the first unlocked position, should be needed again, for instance for checking purposes.

Figure 3:
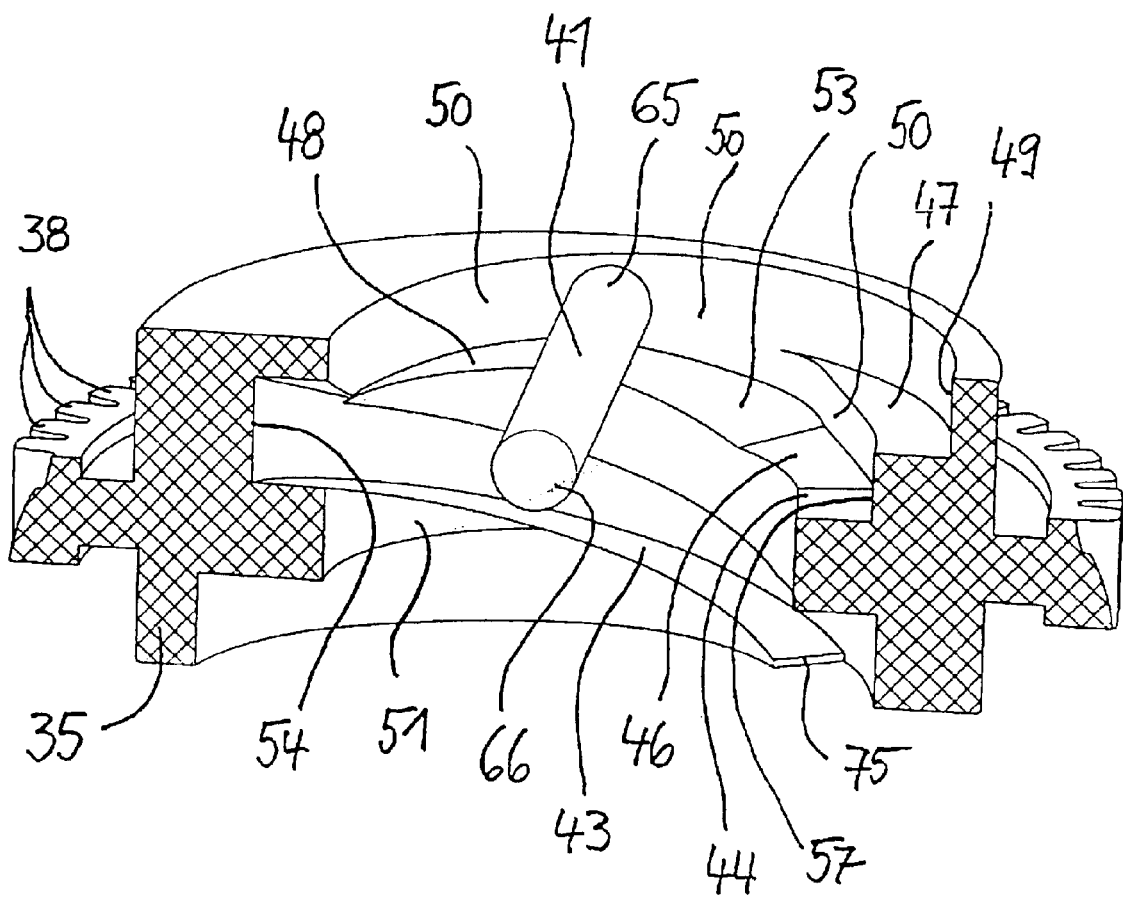
FIG. 3 is a longitudinal section view in perspective of the control element taken along line III—III in FIG. 1 and also shows the cross-pin of the drive element, FIG. 4 corresponds with the topview of FIG. 1, with the control element assuming another rotational position.
Figure 15:
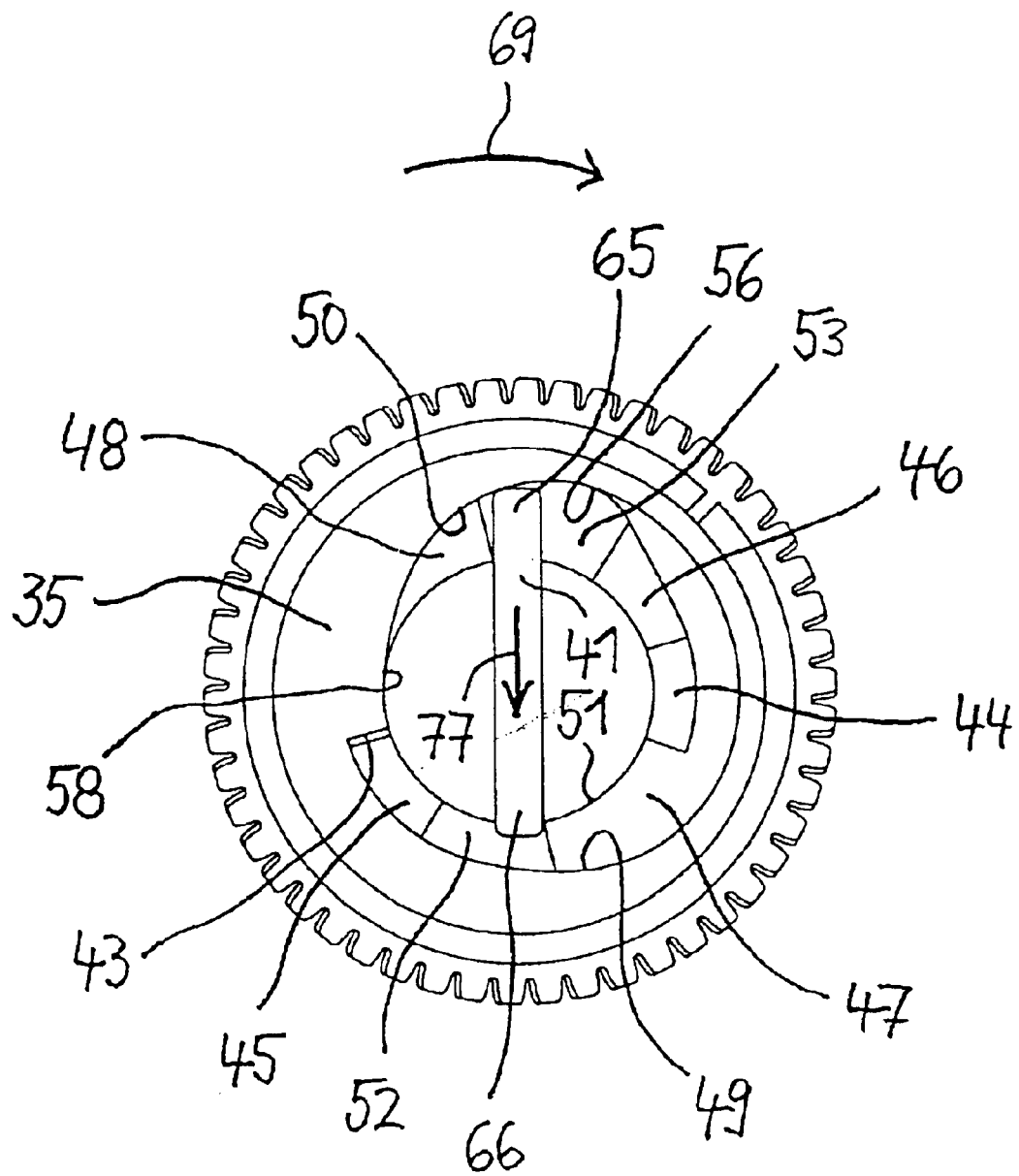

In FIGS. 1 through 3 the control element 35 is shown in the rotational position relative to the cross-pin 41 of the drive element 10 where the transition of the cross-pin ends 65, 66 projecting from the cross-borehole 42 of the drive element 10 from the bevels 52, 53 onto the end faces 47, 48 of the grooves 43, 44 of the control element 35 occurs when the control element 35 is further rotated from the rotational position of FIG. 15 in the direction of the arrow 69.

Figure 6:
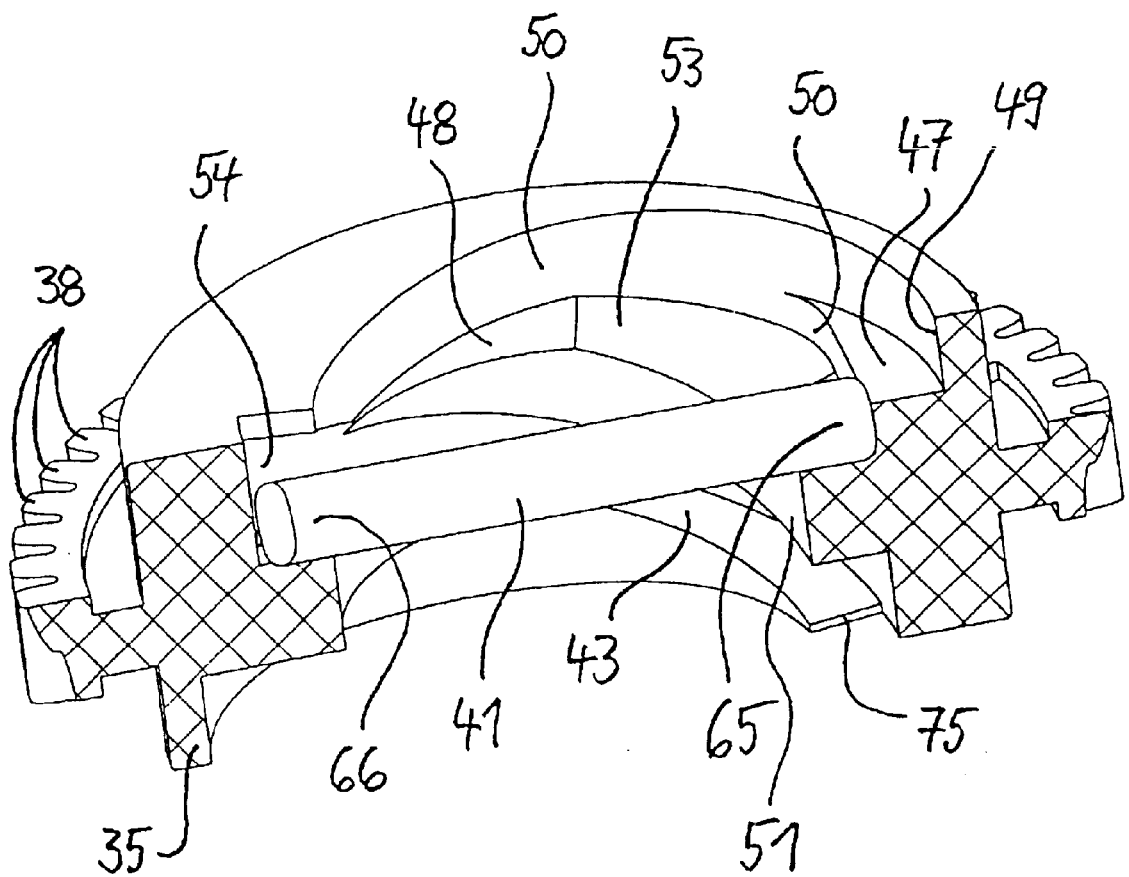
FIG. 6 is a longitudinal section view in perspective of the control element taken along line V—V of FIG. 4 and also showing the cross-pin of the drive element, FIG. 7 corresponds with the topview of FIGS. 1 and 4, with the control element assuming another rotational position.

In FIGS. 4 through 6 the control element 35 is in a rotational position relative to the cross-pin 41 of the drive element 10 where the cross-pin ends 65, 66 projecting from the cross-borehole 42 of the drive element 10 run from the intermediate surfaces 45, 46 of the grooves 43, 44 into the grooves 43, 44 of the control element 35 when the control element 35 is rotated out of the rotational position of FIG. 1 in the direction of the arrow 73 in order to displace the locking element 4 to its locked position.

Figure 9:
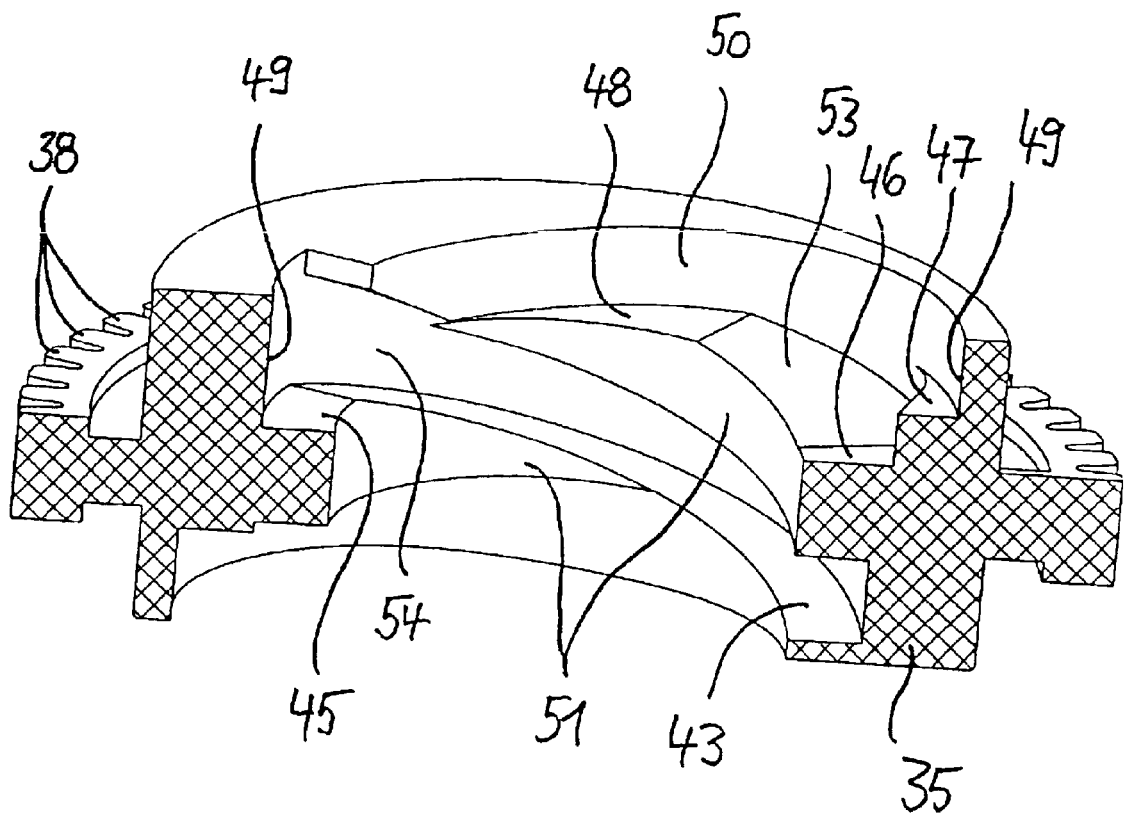
FIG. 9 is a longitudinal section view in perspective of the control element taken along line VIII—VIII in FIG. 7, FIGS. 10–16 are topviews of the control element corresponding with FIGS. 1, 4 and 7, at various rotational positions relative to the cross-pin of the drive element.
Figure 16:
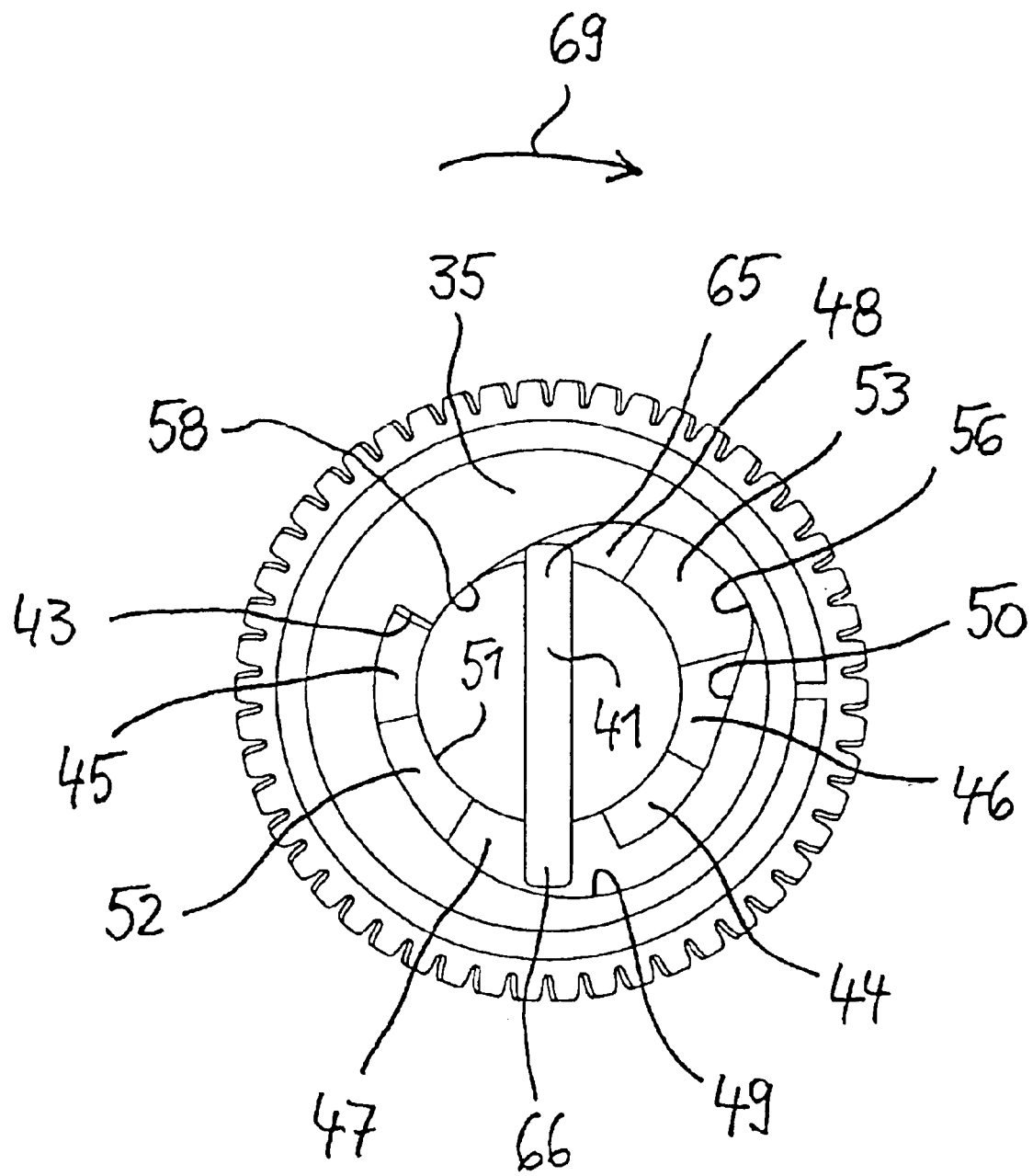

In FIGS. 7 through 9, the control element 35 was rotated out of the rotational position of FIG. 16 in the direction of the arrow 73 in order to displace the locking element 4 to its locked position, the ends 65, 66 of the cross-pin 41 of the drive element 10 projecting from the cross-borehole 42 of the drive element 10 having moved along the end faces 47, 48 onto the bevels 52, 53 of the grooves 43, 44 of the control element 35.

Figure 17:
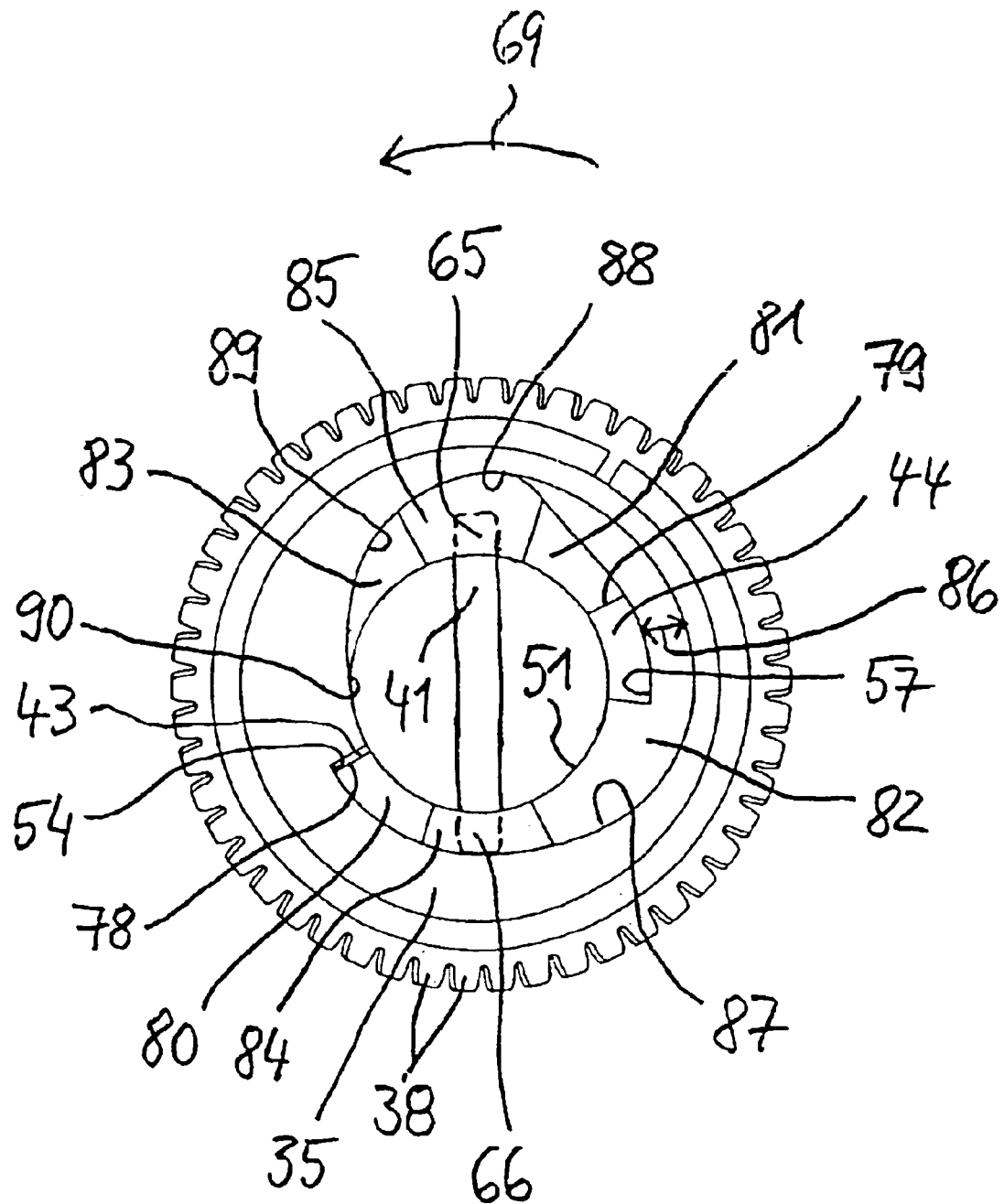
FIG. 17 is a topview of the side facing the locking element of a variation of the control element in the rotational position of FIG. 10 relative to the cross-pin of the drive element.

FIG. 17 shows a control element 35 wherein the two end sides are arranged to match each other in order to cooperate in similar manner with the cross-pin 41 of the drive element 10. Thus, the two inner grooves 43, 44 of the control element 35 also at their ends 78, 79 which are away from the intermediate surfaces 45, 46 and from the end faces 47, 48 and which are associated with the locked position of the locking element 4, each merge onto a further intermediate surface 80, 81 and onto a further end face 82, 83 respectively. The two further intermediate surfaces 80, 81 are situated in the same plane extending perpendicular to the axis of rotation 8 of the control element 35. The two further end faces 82, 83 are situated in the same plane which extends perpendicular to the axis of rotation 8 of the control element 35. A further bevel 84 respectively 85 runs between each further intermediate surface 80 respectively 81 and the associated further end face 82 respectively 83. The slopes of the further bevels 84, 85 and those of the grooves 43, 44 are identical.

The further intermediate surface 80, the adjoining further bevel 84 and the subsequent further end face 82 of the groove 43 are bounded by a third sidewall 87 running from the bottom 54 of the groove 43 outside at a given distance 86 past the other groove 44 and past the further intermediate surface 81 of groove 44. The further intermediate surface 81, the adjoining further bevel 85 and the subsequent further end face 83 of the other groove 44 are bounded by a fourth sidewall 89 running from the bottom 57 of said groove 44 outward to the end 88 of the third sidewall 87 and adjoiningly as a continuation of the third sidewall 87 inward to the borehole 51 of the control element 35 that receives the drive element 10, said fourth sidewall 89 merging at its end 90 within the borehole 51. The vertical third sidewall 87 and the vertical fourth sidewall 89 run in such a manner that the cross-pin 41 of the drive element 10 can always be moved back into the two grooves 43, 44 of the control element 35 upon the transition, following the rotation of the control element 35 in the direction 73 associated with moving the locking element 4 into the locked position, onto the two further bevels 84, 85 when the control element 35 rotates in the opposite direction 69, even when the cross-pin 41 has been pushed by the fourth sidewall 89 fully into the cross-borehole 42 of the drive element 10 and then out again in the opposite direction from the cross-borehole 42.

The invention is not restricted to the motor-vehicle steering column lock described in relation to FIGS. 1 through 17. Instead, as regards motor-vehicle steering column locks of which the control element comprises—instead of the two inner grooves 43, 44 running in helical manner and cooperating with the two ends 65, 66 of the cross-pin 41 of the drive element 10—two inner bevels cooperating with two protrusions of another kind of drive element for a locking element which extend radially and are diametrically opposite relative to the control element's axis of rotation, or an inside thread which cooperates with only one protrusion of a drive element for a locking-element drive projecting radially relative to the axis of rotation of the control element as illustrated, for example, in the aforesaid published U.S. patent application No. US 2001/0025516 A1, and which inner thread merges at the end which is associated with the locking element's unlocked position into a planar end face extending perpendicular to the axis of the rotation of the control element, each bevel or the inside thread may merge via an intermediate surface into the end face of the bevel or of the inside thread in order to actuate a switch. Moreover the invention also applies to those motor-vehicle steering column locks wherein the control element cooperates not with a drive element for the locking element but directly with the locking element itself.

The invention applies not only to locks locking motor-vehicle steering columns but also to locks locking other movable elements.

What is claimed is:

1. Lock for locking a motor-vehicle steering column (3), comprising a locking element (4) displaceable to-and-fro between a locked and an unlocked position and furthermore a control element (35) rotatable to-and-fro by a drive (34) to axially displace in either direction the locking element or a drive element (10) cooperating with the locking element (4), said control element (35) enclosing the locking element or the drive element (10) and comprising two helical inner grooves (43, 44) which cooperate with two radially extending protrusions (65, 66) of the locking element or the drive element (10) located mutually diametrically opposite relative to the axis of rotation (8) of the control element (35),
wherein each groove (43, 44) merges respectively into
end surface (47, 48) located in a plane extending orthogonal to the axis of rotation (8) of the control element (35) via an intermediate surface (45, 46) located in a plane extending perpendicular to the axis of rotation (8) of the control element (35),
wherein the two intermediate surfaces (45, 46) cooperate with the two radially extending protrusions (65, 66) when the locking element (4) assumes a first unlocked position, and
wherein the two end surfaces (47, 48) cooperate with the two protrusions (65, 66), when the locking element (4) has been displaced beyond the first unlocked position into a second unlocked position.

2. Lock as claimed in claim 1, comprising a switch (59) arranged to generate a signal indicating that the locking element (4) has reached the first unlocked position, said switch being actuated by the locking element (4) or the drive element (10), when, during the rotation of the control element (35) in the direction (69) associated with moving the locking element (4) into the second unlocked position, the two protrusions (65, 66) of the locking element or the drive element (10) pass from the two intermediate surfaces (45, 46) to the two end surfaces (47, 48) of the grooves (43, 44) of the control element (35).

3. Lock as claimed in claim 1, wherein
the two radially extending protrusions (65, 66) comprise the ends of a cross-pin (41) axially displaceable in a cross-borehole (42) of the locking element or the drive element (10);
the two intermediate surfaces (45, 46) of the grooves (43, 44) of the control element (35) are located in the same plane extending perpendicular to the axis of rotation (8) of the control element (35) and the two end surfaces (47, 48) of the grooves (43, 44) of the control element (35) are located in a common plane extending perpendicular to the axis of rotation (8) of the control element (35);
the intermediate surface (45), an adjoining bevel surface (52) and the end surface (47) associated with one groove (43) of the control element (35) are bounded by a first sidewall (49) running from the bottom (54) of said one groove (43) externally at a distance (55) from the other groove (44) and past its associated intermediate surface (46); and
the intermediate surface (46), an adjoining bevel surface (53) and the end surface (48) of the other groove (44) of the control element (35) are bounded by a second sidewall (50) running from the bottom (57) of said other groove (44) outward to the first sidewall (49) and then inward to the locking element or the drive element (10), such that the cross-pin (41) of the locking element or the drive element (10) is always moved back, upon transition onto the two bevel surfaces (52, 53) when the control element (35) is rotated in a direction (69) associated with moving the locking element (4) into the second unlocked position, into the two grooves (43, 44) of the control element (35) when the control element (35) is rotated in a direction (73) opposite the direction associated with moving the locking element into the second unlocked position, even when the cross-pin (41) has been pushed by the second sidewall (50) fully into the cross-borehole (42) of the locking element or the drive element (10) and out of the cross-borehole (42) in the opposite direction (77).

4. Lock as claimed in claim 3, wherein
the grooves (43, 44) of the control element (35) each merge at an end (78, 79) corresponding with the locked position of the locking element (4) via a further intermediate surface (80, 81) into a further end surface (82, 83);

the two further intermediate surfaces (80, 81) of the grooves (43, 44) are located in a common plane which extends perpendicular to the axis of rotation (8) of the control element (35) and the two further end surfaces (82, 83) of the grooves (43, 44) of the control element (35) are located in a common plane which extends perpendicular to the axis of rotation (8) of the control element (35);

the further intermediate surface (80), an adjoining further bevel surface (84) and the further end surface (82) of a groove (43) of the control element (35) are bounded by a third sidewall (87) running from the bottom (54) of said groove (43) externally at a distance (86) from and past the other groove (44) of the control element (35) and its further intermediate surface (81), and the further intermediate surface (81), an adjoining further bevel surface (85) and the further end surface (83) of the other groove (44) of the control element (35) are bounded by a fourth sidewall (89) running from the bottom (57) of said groove (44) outward to the third sidewall (87) and then inward to the locking element or the drive element (10);

such that the cross-pin (41) of the locking element or the drive element (10) is always returned, after the transition onto the two further bevel surfaces (84, 85) caused by the rotation of the control element (35) in the direction (73) associated with moving the locking element (4) into the locked position, into the two grooves (43, 44) of the control element (35), when the control element (35) is rotated in the opposite direction (69), even when the cross-pin (41) has been pushed by the fourth sidewall (89) fully into the cross-borehole (42) of the locking element or the drive element (10) and out of the cross-borehole (42) in the opposite direction.

5. Lock for locking a motor-vehicle steering column (3), comprising a locking element (4) displaceable to-and-fro between a locked and an unlocked position and furthermore, a control element (35) rotatable to-and-fro by a drive (34) to axially displace in either direction the locking element or a drive element (10) cooperating with the looking element (4), said control element (35) enclosing the locking element or the drive element (10) and comprising two inner bevel surfaces (43, 44) which cooperate with two radially extending protrusions (65, 66) of the locking element or the drive element (10) located mutually diametrically opposite relative to the axis of rotation (8) of the control element (35), wherein each bevel surface (43, 44) merges into a respective end surface (47, 48) located in a plane extending orthogonal to the axis of rotation (8) of the control element (35) via an intermediate surface (45, 46) located in a plane extending perpendicular to the axis of rotation (8) of the control element (35), wherein the two intermediate surfaces (45, 46) cooperate with the two radially extending protrusions (65, 66) when the locking element (4) assumes a first unlocked position, and wherein the two end surfaces (47, 48) cooperate with the two protrusions (65, 66), when the locking element (4) has been displaced beyond the first unlocked position into a second unlocked position.

6. Lock as claimed in claim 5, comprising a switch (59) arranged to generate a signal indicating that the locking element (4) has reached the first unlocked position, said switch being actuated by the locking element (4) or the drive element (10), when, during the rotation of the control element (35) in the direction (69) associated with moving the locking element (4) into the second unlocked position, the two protrusions (65, 66) of the locking element or the drive element (10) pass from the two intermediate surfaces (45, 46) to the two end surfaces (47, 48) of the bevel surfaces (43, 44) of the control element (35).

7. Lock for locking a motor-vehicle steering column (3), comprising a locking element (4) displaceable to-and-fro between a locked and an unlocked position and furthermore a control element (35) rotatable to-and-fro by a drive (34) to axially displace in either direction the locking element or a drive element (10) cooperating with the locking element (4), said control element (35) enclosing the locking element or the drive element (10) and comprising an inside thread cooperating with a protrusion of the locking element or the drive element, said protrusion extending radially relative to the control element's axis of rotation, wherein the inside thread of the control element (35) merges into an end surface located in a plane perpendicular to the control element's axis, of rotation via an intermediate surface located in a plane extending perpendicular to the axis of rotation (8) of the control element (35), wherein the intermediate surface cooperates with the radially extending protrusion, when the locking element (4) assumes a first unlocked position, and wherein the end surface cooperates with the protrusion, when the locking element (4) has been displaced beyond the first unlocked position into a second unlocked position.

8. Lock as claimed in claim 7, comprising a switch (59) arranged to generate a signal indicating that the locking element (4) has reached the first unlocked position, said switch being actuated by the locking element (4) or the drive element (10), when, during the rotation of the control element (35) in the direction (69) associated with moving the locking element (4) into the second unlocked position, the protrusion of the locking element or the drive element passes from the intermediate surface to the end surface of the control element's inside thread.

* * * * *

UNITED STATES PATENT AND TRADEMARK OFFICE
CERTIFICATE OF CORRECTION

PATENT NO. : 6,755,058 B2
DATED : June 29, 2004
INVENTOR(S) : Horst Zillmann

It is certified that error appears in the above-identified patent and that said Letters Patent is hereby corrected as shown below:

Title page,
Item [57], ABSTRACT, should read:
-- A lock for locking a motor vehicle steering column includes a locking element displaceable to-and-fro between a locked and an unlocked position and a control element rotatable to-and-fro by a drive to axially displace in either direction the locking element or a drive element cooperating with the locking element. The control element encloses the locking element or the drive element and includes two helical inner grooves or bevels or an inner thread each cooperating with a radially extending protrusion of the locking element or the drive element. Each groove, bevel or thread merges into an end surface located in a plane extending orthogonal to the axis of rotation of the control element and includes an intermediate surface also located in a plane extending perpendicular to the axis of rotation of the control element. --

Column 3,
Lines 31 and 32, "German Patent No. 100 30 680" should be -- German Patent No. 100 30 688 --.
Line 57, "Oct. 24" should be -- Oct. 4 --.

Column 9,
Line 36, "locking-element drive" should be -- locking-element --

Signed and Sealed this

Twenty-first Day of December, 2004

JON W. DUDAS
*Director of the United States Patent and Trademark Office*